United States Patent [19]

Carangelo et al.

[11] Patent Number: 5,170,223
[45] Date of Patent: Dec. 8, 1992

[54] DEVICE FOR BLOCKING OF DIVERGENT RADIATION, AS IN SPECTROSCOPY AND INSTRUMENT AND METHOD UTILIZING SAME

[75] Inventors: Robert M. Carangelo, Glastonbury; John R. Haigis, Coventry; Philip W. Morrison, Jr., South Windsor, all of Conn.

[73] Assignee: Advanced Fuel Research, Inc., East Hartford, Conn.

[21] Appl. No.: 620,767

[22] Filed: Dec. 3, 1990

[51] Int. Cl.[5] .............................................. G01B 9/02
[52] U.S. Cl. .................................. 356/346; 250/237 R
[58] Field of Search ....................... 356/345, 346, 358; 250/237 R

[56] References Cited

U.S. PATENT DOCUMENTS

| | | | |
|---|---|---|---|
| 3,753,619 | 8/1973 | Thorpe et al. | 356/346 |
| 4,511,986 | 4/1985 | Bellar et al. | 356/346 |
| 4,907,091 | 3/1990 | Yoshida et al. | 250/237 R |
| 4,932,780 | 6/1990 | Izumi | 356/346 |

Primary Examiner—Samuel A. Turner
Attorney, Agent, or Firm—Ira S. Dorman

[57] ABSTRACT

The spectrometer permits transmission and emission measurements to be made selectively and accurately without extinguishing the internal radiation source. It includes a device that blocks the divergent source-beam radiation that would otherwise corrupt the emission signal received by the detector.

30 Claims, 4 Drawing Sheets

LEGEND
—·—·— LOWER BEAM PATH
— — — — UPPER BEAM PATH

LEGEND
—·—·— LOWER BEAM PATH
— — — — UPPER BEAM PATH
—·——·— LOWER BEAM (DIVERGENT)
— — — — UPPER BEAM (DIVERGENT)

LEGEND

—·—·— LOWER BEAM PATH
——— UPPER BEAM PATH
—··—··— LOWER BEAM (DIVERGENT)

DEVICE FOR BLOCKING OF DIVERGENT RADIATION, AS IN SPECTROSCOPY AND INSTRUMENT AND METHOD UTILIZING SAME

BACKGROUND OF THE INVENTION

The accuracy of spectrometric analyses of objects and materials, using transmission and emission measurements, will depend substantially upon the integrity of the radiation beams detected. Infrared spectrometers currently used for making such measurements may employ a Michelson interferometer, through which is established an optical path between a silicon carbide (globar) internal radiation source and at least one transmission port. The instrument has a separate port for making emission measurements, which lies in optical communication with the transmission port by virtue of a shared portion of the optical path through the interferometer. Both the transmission and the emission characteristics of a sample placed beyond the transmission port can therefore be determined utilizing such a spectrometer.

Despite the fact that the internal instrument radiation source is used only in making transmission measurements, it is highly desirable to maintain it in operation during emission measurements as well, primarily because of the time that is required to bring the element back to a stable temperature condition after it has been allowed to cool. A difficulty arises however because of the tendency for stray or divergent radiation from the globar to be so transmitted and refracted by the beam-splitter of the interferometer as to appear at the emission detector, thereby corrupting the true emission signal and significantly compromising the accuracy of the measurement. Bellar et al U.S. Pat. No. 4,511,986, issued Apr. 16, 1985, provides a method and apparatus for simultaneously recording multiple FT-IR signals using an interferometer, which signals may relate to the temperature, pressure or mass spectrum of a sample; however it does not address the foregoing problem.

Accordingly, it is the broad object of the present invention to provide an optical instrument, adapted for selective use for making transmission and emission measurements, wherein divergent radiation from the internal radiation source beam is blocked sufficiently to avoid substantially the corruption of emission measurement signals.

Other objects of the invention are to provide such an instrument incorporating an interferometer, in which is provided a device having structure disposed in the path of divergent source beam radiation, so as to block passage into the interferometer optics of such deviant radiation.

More specific objects are to provide such an instrument in which the blocking device partially shields a beam-splitter so as to permit the source beam radiation to pass into the interferometer optics through only one portion thereof and within a defined stratum; and to provide such an instrument by which both transmission and emission measurements can be made selectively and sequentially, with the internal radiation source maintained in operation and without substantial corruption of the emission beam.

An additional object of the invention is to provide a blocking device having the foregoing features and advantages, which device may in addition be of relatively simple and inexpensive construction.

A further object is to provide a method for selectively measuring, in rapid succession, radiation emitted from, and radiation transmitted through or reflected by, a sample, without extinguishing the radiation source means used in making the transmission or reflection measurements.

SUMMARY OF THE INVENTION

It has now been found that certain of the foregoing and related objects of the invention are attained by the provision of an optical instrument which includes means for producing a substantially collimated radiation beam, and beam-splitter means, such means being so relatively positioned as to direct the source beam along an optical path toward only one of the functional portions of the beam-splitter means. A blocking device positions structure proximate both the optical path and the beam-splitter means, and presents a substantially nonreflective surface along the path and in substantial alignment with a line of demarcation between the two portions of the beam-splitter. The non-reflective surface serves to block the passage of radiation, divergent from the axis of the collimated source means beam, toward the functional portion of the beam-splitter means that is disposed to the opposite side of the line of demarcation.

Generally, the source means will generate infrared radiation, and the beam-splitter means will comprise a planar, IR-transparent substrate coated on its opposite faces with a beam-splitting material, such as germanium, to provide the two functional portions, the coated areas having adjacent edges cooperatively defining the line of demarcation; the substrate will normally be circular, with the line of demarcation extending diametrically. In preferred embodiments, the instrument will be a spectrometer capable of use for selectively measuring radiation that is transmitted through, and emitted by, a sample. Such a spectrometer will have means defining a transmission port and an emission port, as well as means establishing optical paths through the interferometer, from the radiation source means to the transmission port, and from the transmission port to the emission port, with the blocking device being effective to block radiation from the source means to the emission port. More particularly, in the preferred spectrometer radiation from the source means will enter the optics of the interferometer through the "one" functional portion of the beam-splitter means, and will exit toward the transmission port through its "other" functional portion; radiation emanating outwardly of the transmission port will enter the interferometer optics through the "other" functional portion of the beam-splitter means, and will exit toward the emission port through the "one" portion thereof.

In especially preferred embodiments, the blocking device will include a barrier strip element that extends along the line of demarcation between, and overlaps the edges of, the coated areas of the beam-splitter means, thus blocking the passage of radiation along and adjacent that line. The barrier strip will usually have an outer surface that lies in close proximity to the adjacent face of the beam-splitter substrate, for maximum effectiveness, and the blocking structure of the device will generally be a flat wall, with a nonreflective surface that is planar and of blackbody character.

The blocking device will most desirably comprise a body that provides rear wall structure in effectively superimposed, and at least partially shielding, position over the "other" functional portion of the beam-splitter means. An element having a planar reflective surface, disposed at an angle to the flat wall structure and directed outwardly of the optical path, may be provided on the body of the blocking device, which may also include a base and means for adjustably mounting the blocking structure in spaced relationship thereto.

Related objects are attained by the provision of an instrument in which is defined contiguous optical strata bounded by a common plane. The radiation source means and the strata-defining means are so relatively positioned in the instrument as to direct the source beam along an optical path that lies parallel to the common boundary plane and within one of the strata, and the nonreflective surface of the blocking device blocks the passage of axially divergent radiation from the "one" stratum toward the other.

Other objects of the invention are attained by the provision of a blocking device, as herein described.

Further objects are attained in a method for measuring emitted and transmitted or reflected radiation, using an instrument having the features described. The carrying out the method, the internal radiation source means of the instrument is operated to produce a beam of radiation projected along a first portion of the optical path, lying parallel to the common plane and within the "one" stratum defined, while blocking therealong the passage of radiation, divergent from the axis of the source means beam, toward the "other" stratum. First and second detector means, disposed outwardly of emission and transmission ports which lie on a second portion of the optical path, are selectively accessed, successively and rapidly and without extinguishing the radiation source means, to measure emission and transmission or reflection values for the sample.

In the preferred method, the selective accessing step will be effected electronically, and the spectrometer used will include electronic data processing means, to enable measurements to be made of the radiation values detected. Most desirably, the selective accessing of the detector means will be effected during a cycle of less than two seconds, divided into two equal phases.

DETAILED DESCRIPTION OF THE ILLUSTRATED EMBODIMENTS

Figure 1:
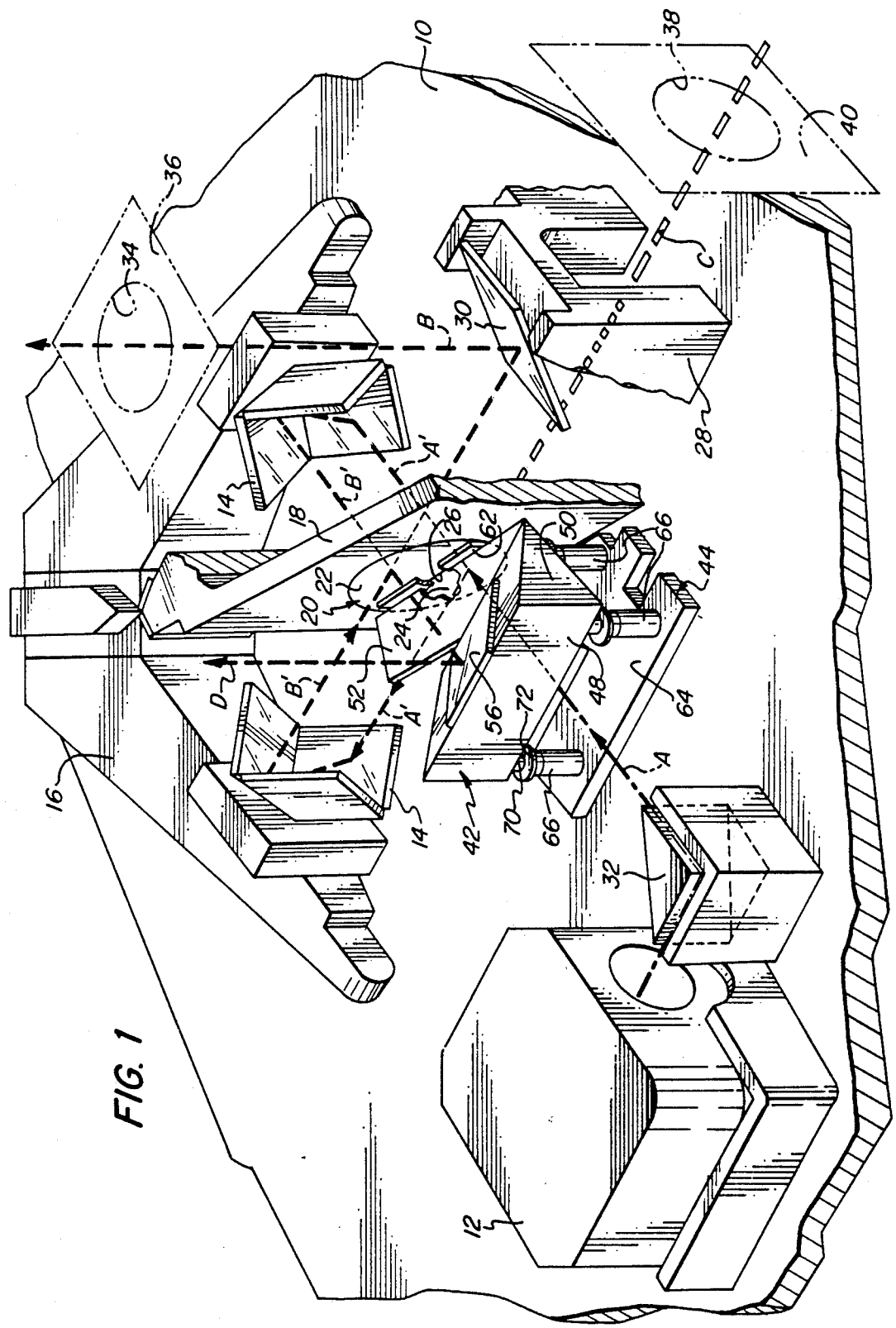
FIG. 1 is a fragmentary perspective view of an infrared spectrometer embodying the present invention.

Turning now in detail to FIG. 1 of the drawings, therein illustrated is an instrument embodying the present invention, excluding components that are not necessary to the understanding and description hereof. The instrument (which may for example take the form of a Bomem-Michelson, Model 102 or 110, infrared spectrometer) has a chassis panel 10 on which are supported a globar unit 12, providing an infrared radiation source, and a Michelson interferometer, including a pair of cube-corner reflectors 14 supported upon pivotable, reciprocating arm structure 16. The panel 10 also supports a vertical wall 18 (substantially bisecting the arm structure 16), in which a beam-splitter 20 is in turn mounted. The beam-splitter consists of an IR-transparent, planar circular substrate 20, coated with germanium (or another beam-splitting material) to provide functional portions 22, 24 separated by a diametric seam or line of demarcation 26; the seam results from the application of the coating of which the sections 22 and 24 are formed to the opposite faces of the substrate. Although not illustrated, it might be mentioned that notch-like, germanium-free areas will be provided at the ends of the line of demarcation 26, to avoid blocking of the laser beams that are conventionally used for timing purposes in mechanisms such as this. Mounting structure 28 on the panel 10 supports a plane mirror 30, which is disposed at an angle of 45° to the panel 10 surface (and hence at an angle of 45° to horizontal, in normal operation of the instrument).

The heating element (not seen) of the globar unit 12 generates, and projects along path A, an infrared source beam, which is bent at a right angle by a collimating mirror 32 to impinge upon the lower portion 24 of the beam-splitter 20. The beam-splitter partially transmits and partially reflects the beam, thereby producing subordinate beams projected along two mutually perpendicular paths A'. Each subordinate beam is directed to one of the cube-corner retroreflectors 14, to be reflected upwardly and reversely thereby along paths B', which are strictly parallel to the corresponding paths of incidence A'. At the upper portion 22 of the beam-splitter, the beams combine and produce two beams, one of which passes along path B and is reflected by the plane mirror 30 through the transmission port 34, formed in the schematically illustrated cover wall 36 of the instrument. The interferometer may thus be regarded to define two contiguous optical strata, bounded by a horizontal plane through the seam of the beam-splitter, on which plane lie the apices of the cube-corner reflectors.

It will be appreciated that the beam passing along path B can be used in making measurements of radiation transmitted through or reflected by a sample (now shown) positioned outwardly of the transmission port 34. Conversely, measurements of emission from the sample can be made using the same path through the optics of the interferometer, but with the radiation projected of course in the opposite direction. Thus, emission radiation passes initially along path B and then along subordinate paths B', thereafter being reflected downwardly by the cube-corner reflectors 14 to follow reverse subordinate paths A', ultimately to combine at the lower portion 24 of the beam-splitter 20. This radiation (except for a fraction that retraces path A and is absorbed is the globar) is transmitted along path C through the emission port 38 formed in the schematically illustrated sidewall 40 of the instrument housing, at which location an outwardly positioned detector (not shown) can be utilized to make emission measurements.

Figure 4:
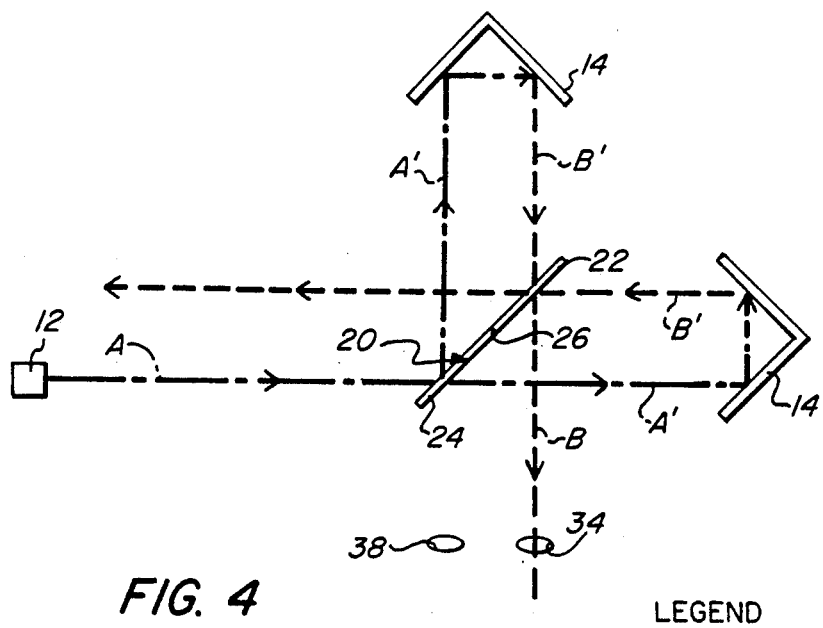
FIG. 4 is a schematic representation of ideal radiation beam paths established in spectrometers of the kind shown in FIG. 1.

Basic components of the interferometer, and the optical paths traversed by an ideal transmission beam generated at the globar unit 12, are shown diagrammatically in FIG. 4. The representation of FIG. 5 illustrates graphically the problem to which the instant invention is addressed.

Figure 5:
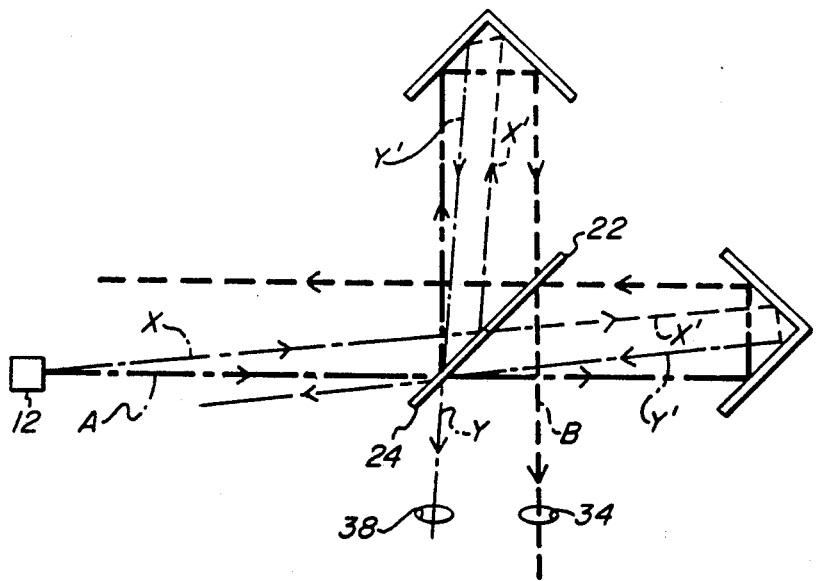
FIG. 5 is a representation similar to that of FIG. 4, depicting an aberrant condition attributable to the unblocked passage of radiation divergent from the axis of the source beam.

As indicated in FIG. 5, the source beam is not strictly collimated, having instead components which deviate from its axis and proceed at an angle thereto, traversing the lower stratum along divergent paths (represented by "X" in the Figure) and entering the upper stratum of the interferometer optics as subordinate beams along paths X'. When reflected by the cube-corner reflectors 14, the deviant beams are transmitted downwardly and then along reverse parallel subordinate paths Y' in the lower stratum, ultimately to pass along path Y through the emission port 38. The stray radiation from the infrared source thereby corrupts the emission radiation signal generated by the sample, appearing at the detector disposed outwardly of the emission port 38 and thus producing a false value. By preventing the deviant radiation component from reaching the beam-splitter 20, the blocking device of the invention avoids the interference just described.

Figure 2:
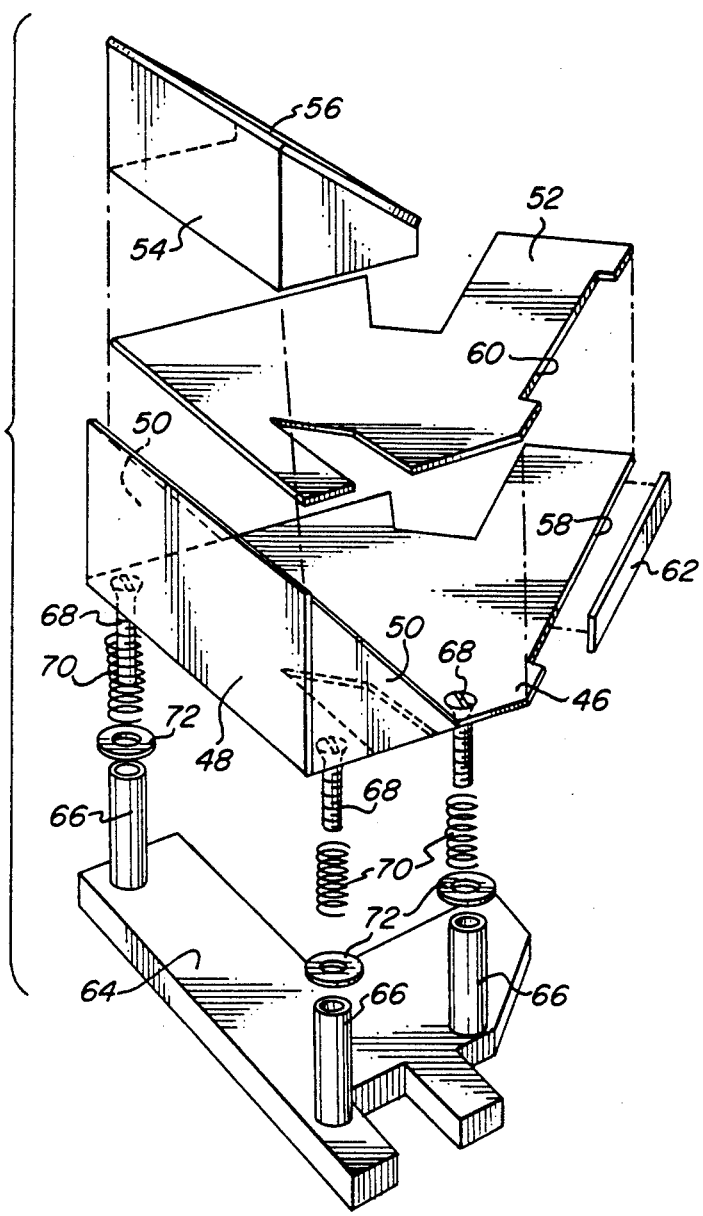
FIG. 2 is an exploded perspective view of the device employed in the instrument of FIG. 1 for blocking divergent radiation, drawn to an enlarged scale.
Figure 3:
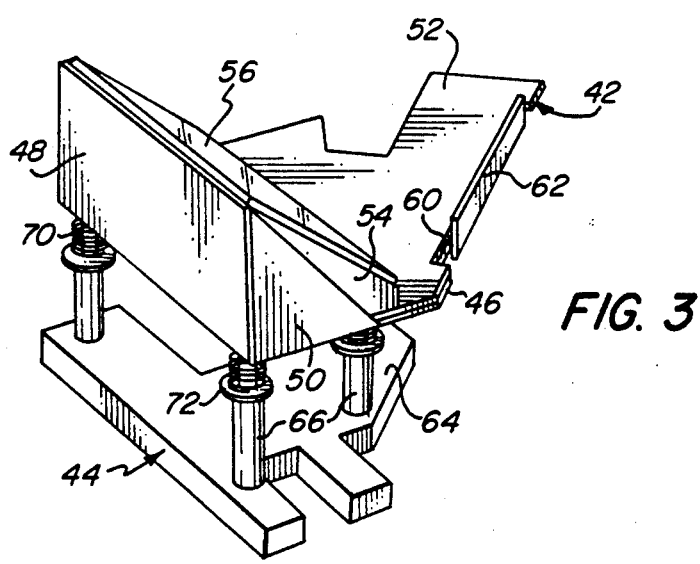
FIG. 3 is a perspective view of the blocking device shown in the preceding Figures.

As best seen in FIGS. 2 and 3, the blocking device consists of a body, generally designated by the numeral 42, and a base generally designated by the numeral 44. The body 42 includes a bottom wall 46, a rear wall 48 and end gussets 50. These elements (and others hereinafter described) may desirably be of cardboard construction, with exposed surfaces coated by black matte paint to render them highly absorbent of radiation and to simulate effectively a theoretical blackbody. For structural strength, the body 42 additionally includes a rigid liner 52 of black-painted aluminum, superimposed upon the bottom wall 46. An insert 54, desirably constructed from aluminum, consists of three panels configured and folded so as to provide a support for a plane mirror 56, angularly disposed thereupon; the insert 54 is seated within the cavity defined by the wall components 46, 48, 50. The bottom wall 46 and the liner 52 are notched at 58 and 60, respectively, to receive a narrow cardboard strip element 62, so fastened as to extend outwardly beyond the lower and upper surfaces of the wall 46 and liner 52, respectively. An angle of 45° exists between the outer surfaces of the rear wall 48 and the strip element 62 (taken in a horizontal plane), and also between the surface of the mirror 56 and the planes of the bottom wall 46 and liner 52 (taken in a vertical plane).

The base 44 of the blocking device consists of an aluminum bottom plate 64, from which project upwardly three internally threaded posts 66. The posts serve to receive mating screws 68, extending through apertures in the bottom wall 46 and through coil springs 70 and washers 72, providing means for mounting the body 42 upon the base 44 so as to permit precise adjustment of the spacing therebetween, as well as levelling of the body.

Referring again specifically to FIG. 1, it can be seen that the blocking device is installed in the instrument by securing (by means not shown) the plate 64 of the base 44 upon the chassis panel 10, so positioned as to lie in the path A of the beam projected from the collimating mirror 32. The body 42 is adjusted so as to cause the nonreflecting undersurface of the bottom wall 46 to lie closely proximate the beam path A, and to extend therealong without interfering with the transmission of radiation to the lower portion 24 of the beam-splitter 20. The body 42 is also so positioned as to dispose the strip element 62 along the line of demarcation 26 between the portions 22, 24, and over marginal elements thereof, so as to prevent stray radiation, traversing the lower stratum of the instrument, from passing through the seam and the adjacent edge areas of the coated portions 22, 24.

Figure 6:
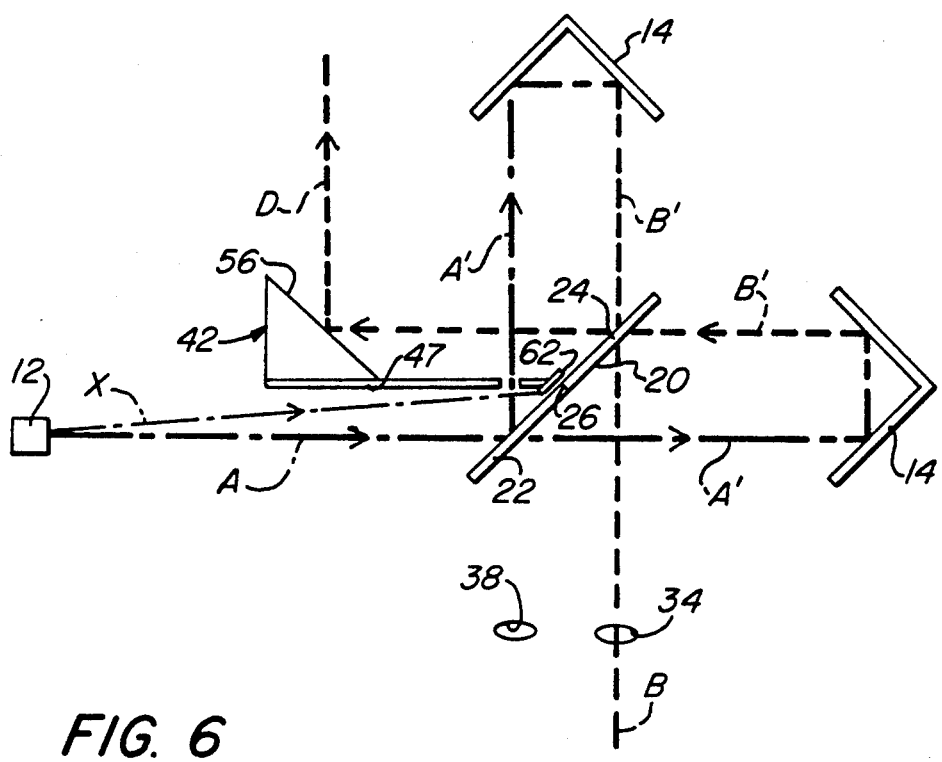
FIG. 6 is a similar representation indicating correction of the condition shown in FIG. 5, achieved by incorporation of the blocking device of the invention into the spectrometer, as herein described.

It can be seen from FIG. 6 that the deviant radiation (such as the rays following path X) is thereby effectively absorbed and blocked by the bottom wall 46 and the strip element 62. This in turn prevents radiation generated by the globar unit from impinging upon the portions of the cube-corner retroreflectors lying in the upper stratum, thus avoiding the corruption of the emission signal that would otherwise occur. FIG. 6 (as well as FIG. 1) also shows the function of the plane mirror 56 on the insert 54 of the blocking device, which is simply to reflect upwardly along path D the second beam that is produced by the combined radiation from path B', which beam may also be used for making transmission measurements, if so desired.

It will of course be appreciated that may variations can be made in the structure and arrangement of the instrument and blocking device of the invention, without departure from the novel concepts hereof. For example, although the construction and configuration of the body of the blocking device is deemed to represent the best mode of carrying out the invention, modifications therein will no doubt occur to those skilled in the art. Moreover, the present concepts are believed to be applicable to spectrometers and systems other than that which has been described herein.

Thus, it can be seen that the present invention provides an optical instrument, adapted for selective use for making transmission and emission measurements, wherein divergent radiation from the internal radiation source beam is blocked sufficiently to avoid substantially the corruption of emission measurement signals. The instrument will generally incorporate an interferometer, and a device having structure so disposed, in the path of the divergent source beam radiation, as to block its passage into the interferometer optics. The invention also provides a relatively simple and inexpensive blocking device that is especially suited for use in an instrument having such capabilities, and it provides a unique method for selectively measuring, in rapid succession, the radiation emitted from and transmitted through a sample.

Having thus described the invention, what is CLAIMED is:

1. In an optical instrument including radiation source means for producing a substantially collimated radiation beam, and beam-splitter means having adjacent functional portions disposed to opposite sides of a common line of demarcation, each of said portions being capable of partial reflection and partial transmission of the beam, said source means and said beam-splitter means being so relatively positioned in said instrument as to direct the beam along an optical path toward only one of said functional portions on one side of said line; the improvement comprising a device, positioned proximate said optical path and said beam-splitter means, having stationary blocking structure with a substantially non-reflective surface extending along said path in substantial alignment with said line of demarcation, said nonreflective surface blocking the passage of radiation, divergent from the axis of the source means beam, toward the other of said functional portions of said beam-splitter means on the opposite side of said line of demarcation.

2. The instrument of claim 1 wherein said source means includes a source of infrared radiation.

3. The instrument of claim 2 wherein said source comprises a silicon carbide heating element.

4. The instrument of claim 1 wherein said beam-splitter means comprises a planar substrate having opposite faces, one of said faces having a coated area providing said one functional portion and the other of said faces having a coated area providing said other portion, said coated areas having adjacent edges which cooperatively define said line of demarcation.

5. The instrument of claim 4 wherein said substrate is circular, and wherein said line of demarcation extends diametrically.

6. The instrument of claim 1 wherein said instrument is a spectrometer comprised of an interferometer, and wherein said beam-splitter means is a component of said interferometer.

7. The instrument of claim 6 wherein said spectrometer is capable of use for selectively measuring radiation transmitted through a sample and radiation emitted thereby, said spectrometer having means defining a transmission port and an emission port and having means establishing optical paths, through said interferometer, from said source means to said transmission port and from said transmission port to said emission port, said device effectively blocking such divergent radiation from said source means to said emission port.

8. The instrument of claim 7 wherein radiation from said source means enters the optics of said interferometer through said one functional portion of said beam-splitter means and exits therefrom, toward said transmission port, through said other functional portion; and wherein radiation emanating from outwardly of said transmission port enters said interferometer optics through said other functional portion of said beam-splitter means and exits therefrom, toward said emission port, through said one functional portion thereof.

9. The instrument of claim 4 wherein said device includes a barrier strip element extending along said line of demarcation and overlapping said edges of said coated areas, said strip element blocking the passage of radiation through said beam-splitter means along and adjacent said line.

10. The instrument of claim 9 wherein said strip has an outer surface lying in close proximity to the adjacent one of said beam-splitter means faces.

11. The instrument of claim 1 wherein said blocking structure of said device is a flat wall, and wherein said nonreflective surface is planar.

12. The instrument of claim 11 wherein said planar nonreflective surface is of substantially theoretical blackbody character.

13. The instrument of claim 11 wherein said device includes a body comprising said flat wall structure and rear wall structure, said rear wall structure extending from said flat wall structure in the direction of said opposite side of said line of demarcation, and being disposed in effectively superimposed position at least partially over said other functional portion of said beam-splitter device.

14. The instrument of claim 13 wherein said body includes a planar reflective element having a reflective surface disposed at an angle to said flat wall structure and directed outwardly of said optical path.

15. The instrument of claim 1 wherein said device has a base, and means for mounting said blocking structure in spaced relationship to said base for adjustment of the position of said structure relative thereto.

16. The instrument of claim 15 wherein said nonreflective surface is disposed in a horizontal plane in the normal, operative position of said instrument.

17. In an optical instrument including radiation source means for producing a substantially collimated radiation beam, and means definining contiguous optical planes bounded by a common plane, said source means and said contiguous plane-defining means being so relatively positioned in said instrument as to direct the beam along an optical path parallel to said common plane and within one of said contiguous planes; the improvement comprising a device positioned proximate said optical path and having blocking structure with a fixed substantially nonreflective surface extending along said common plane, said nonreflective surface blocking the passage of radiation, divergent from the axis of the source means beam, toward the other of said contiguous planes.

18. The instrument of claim 17 wherein said instrument is a spectrometer capable of use for selectively measuring radiation transmitted through a sample and radiation emitted thereby, said spectrometer having an interferometer, having means defining a transmission port and an emission port and having means establishing optical paths, through said interferometer, from said source means to said transmission port and from said transmission port to said emission port, said emission and transmission ports being operatively disposed in said one plane and said other plane, respectively, and said device effectively blocking such divergent radiation from said source means to said emission port.

19. The instrument of claim 18 wherein said interferometer comprises a beam-splitter having two functional portions separated by a line of demarcation, and a pair of cube-corner reflectors, said contiguous planes being bounded by a plane through said line of demarcation and on which lie the apices of said cube-corner reflectors.

20. The instrument of claim 17 wherein said planar nonreflective surface is of substantially theoretical blackbody character, and wherein said source means includes a source of infrared radiation.

21. A device for use in an optical instrument to block divergent radiation from an internal radiation source beam, said device comprising: a body having a bottom wall with a rearward margin and an underlying, substantially nonreflective planar wall surface, a rear wall extending upwardly from along said rearward margin of said bottom wall, and a barrier strip element forwardly disposed on said body and extending along and traversing the plane of said planar wall surface; a supporting base; and means for mounting said body in spaced relationship above said base for adjustment of the position of said body relative thereto.

22. The device of claim 21 wherein said body additionally includes a slanted top wall extending from an upper portion of said rear wall and declining toward said bottom wall, said top wall having a reflective surface disposed outwardly thereon.

23. The device of claim 21 wherein said body has opposite ends defined by sidewall structure.

24. The device of claim 21 wherein said planar nonreflective surface is of substantially theoretical blackbody character.

25. The device of claim 21 wherein both said rear wall and said strip element of said body have substantially planar faces disposed in planes perpendicular to said underlying surface, said planar faces being disposed at an acute angle to one another.

26. The device of claim 25 wherein said acute angle has a value of 45°.

27. A method for selectively measuring, in rapid succession, radiation emitted from a sample and radiation transmitted through or reflected by the same sample, comprising the steps:

(a) providing an optical instrument having internal radiation source means, for producing a substantially collimated radiation beam, and means defining contiguous optical planes bounded by a common plane, said source means and said contiguous plane-defining means being so relatively positioned in said instrument as to direct the beam from said source means along an optical path including a first portion lying parallel to said common plane and within one of said contiguous planes; said instrument having means defining an emission port operatively disposed within said one plane and a transmission port operatively disposed within the other of said contiguous planes, and said optical path including a second portion on which both of said ports are disposed for optical communication therebetween; and said instrument also having first and second detector means, operatively disposed outwardly of said emission and transmission ports, for detecting radiation passing therethrough, respectively;

(b) operatively positioning a sample outwardly of said transmission port, in optical communication with said radiation source means, said emission port, and said first and second detector means;

(c) operating said internal radiation source means to produce a beam of radiation projected along said first and second portions of said optical path;

(d) blocking, along said first optical path portion, the passage of radiation, divergent from the axis of the source means beams, toward said other plane; and (e) successively and rapidly, and without extinguishing said radiation source means, selectively accessing said first and second detector means to measure, respectively, radiation emitted by said sample and passing sequentially through said transmission and emission ports, along said second optical path portion, and radiation transmitted through or reflected by said sample, originating at said source means and passing along said optical path through said transmission port.

28. The method of claim 27 wherein said instrument is a spectrometer, additionally having an interferometer through which passes said second optical path portion.

29. The method of claim 28 wherein said selective accessing is effected electronically, wherein said spectrometer includes electronic data processing means, and wherein the electrical signals obtained from said accessing are processed by said data processing means to enable measurements to be made of the radiation values detected.

30. The method of claim 27 wherein said selective accessing is effected during a cycle of less than two seconds, said cycle being divided equally into a phase of accessing of said first detector and a phase of accessing of said second detector.

* * * * *